US012361357B2

(12) United States Patent
Ma et al.

(10) Patent No.: US 12,361,357 B2
(45) Date of Patent: Jul. 15, 2025

(54) RISK CONTROL METHOD, COMPUTER DEVICE, AND READABLE STORAGE MEDIUM

(71) Applicant: SHANGHAI BILIBILI TECHNOLOGY CO., LTD., Shanghai (CN)

(72) Inventors: Jiayi Ma, Shanghai (CN); Zhonghao Shen, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 275 days.

(21) Appl. No.: 17/636,283

(22) PCT Filed: Apr. 29, 2020

(86) PCT No.: PCT/CN2020/087669
§ 371 (c)(1),
(2) Date: Feb. 17, 2022

(87) PCT Pub. No.: WO2021/031607
PCT Pub. Date: Feb. 25, 2021

(65) Prior Publication Data
US 2022/0294821 A1 Sep. 15, 2022

(30) Foreign Application Priority Data
Aug. 22, 2019 (CN) .......................... 201910780554.0

(51) Int. Cl.
*H04L 9/40* (2022.01)
*G06F 16/215* (2019.01)
*G06Q 10/0635* (2023.01)
(52) U.S. Cl.
CPC ..... *G06Q 10/0635* (2013.01); *H04L 63/1425* (2013.01); *H04L 63/1483* (2013.01)

(58) Field of Classification Search
CPC ............. H04L 63/1483; H04L 63/1425; H04L 67/535; G06F 21/6245; G06F 11/3438; H04W 12/68
See application file for complete search history.

(56) References Cited

U.S. PATENT DOCUMENTS 9,356,939 B1 * 5/2016 Gates .................... H04L 63/104
10,834,119 B1 * 11/2020 Casillas .............. H04L 63/0869
(Continued)

FOREIGN PATENT DOCUMENTS

| CN | 101996381 A | 3/2011 |
| CN | 104423975 A | 3/2015 |

(Continued)

OTHER PUBLICATIONS

Wen et al., "Design of user behavior analysis model of e-commerce website based on Spark," 2020 7th International Conference on Information Science and Control Engineering (ICISCE) Year: 2020 | Conference Paper | Publisher: IEEE.*

(Continued)

*Primary Examiner* — Roderick Tolentino
(74) *Attorney, Agent, or Firm* — BakerHostetler

(57) ABSTRACT

The present disclosure describes risk control techniques. The techniques comprise calculating risk scores and determining a risk degree, wherein the calculating risk scores includes performing calculation processing on bury point data of a user according to a predetermined risk scoring rule to acquire the risk scores; and the determining a risk degree includes receiving a service request from the user, determining a corresponding risk assessment rule and a corresponding predetermined threshold based on the service request, determining an assessment score by searching for a risk score based on the corresponding risk assessment rule from the risk scores, and determining a risk assessment result by comparing the assessment score with the corre- (Continued)

sponding predetermined threshold. The procedures of calculating risk scores and determining a risk degree are performed separately, such that the high-speed response of a risk control service is ensured.

18 Claims, 7 Drawing Sheets

(56) References Cited

U.S. PATENT DOCUMENTS

| | | | | |
|---|---|---|---|---|
| 2004/0199462 | A1* | 10/2004 | Starrs | G06Q 20/4037 705/39 |
| 2008/0021803 | A1* | 1/2008 | Ahles | G06Q 40/04 705/45 |
| 2013/0097709 | A1* | 4/2013 | Basavapatna | H04L 63/1441 726/25 |
| 2015/0066575 | A1* | 3/2015 | Baikalov | G06Q 10/0635 705/7.28 |
| 2015/0127547 | A1* | 5/2015 | Powell | G06Q 20/4016 705/67 |
| 2019/0287182 | A1* | 9/2019 | Chetal | G06Q 10/06398 |
| 2020/0211325 | A1* | 7/2020 | Kaizerman | G06F 16/2477 |
| 2021/0006542 | A1* | 1/2021 | Myneni | H04L 63/20 |

FOREIGN PATENT DOCUMENTS

| | | |
|---|---|---|
| CN | 105959235 A | 9/2016 |
| CN | 106469376 A | 3/2017 |
| CN | 107067157 A | 8/2017 |
| CN | 107147621 A | 9/2017 |
| CN | 107679897 A | 2/2018 |
| CN | 107886430 A | 4/2018 |
| CN | 108875388 A | 11/2018 |
| CN | 109360104 A | 2/2019 |
| CN | 109739849 A | 5/2019 |
| CN | 110033153 A | 7/2019 |
| CN | 110033171 A | 7/2019 |
| CN | 110084007 A | 8/2019 |

OTHER PUBLICATIONS

Mei et al., "Research on User Behavior Analysis Model of Financial Industry in Big Data Environment," 2020 IEEE International Conference on Artificial Intelligence and Computer Applications (ICAICA) Year: 2020 | Conference Paper | Publisher: IEEE.*
International Patent Application No. PCT/CN2020/087669; Int'l Written Opinion and Search Report; dated Jul. 2, 2020; 6 pages.
European Patent Application No. 20854478.3; Extended Search Report; dated Jun. 21, 2022; 9 pages.
Marz et al.; "Big Data: Principles and best practices of scalable real-time data systems"; Manning; $1^{st}$ Edition; © 2015; 330 pages.
"Redis"; https://en.wikipedia.org/w/index.php?title=Redis&old=911901139; Wikipedia; Aug. 2019; accessed Jun. 7, 2022; 7 pages.
Liu et al.; "Survey of Real-time Processing Systems for Big Data"; Proceedings of the $18^{th}$ Int'l Database Engineering & Applications Symposium; Jul. 2014; p. 356-361.
Rao et al.; "The big data system, components, tools, and technologies: a survey"; Knowledge and Information Systems; vol. 60; 2019; p. 1165-1245.

* cited by examiner

RISK CONTROL METHOD, COMPUTER DEVICE, AND READABLE STORAGE MEDIUM

The present application is the U.S. National Stage of International Application No. PCT/CN2020/087669, filed on Apr. 29, 2020, which claims priority to Chinese patent application No. 201910780554.0, filed with the China National Intellectual Property Administration on Aug. 22, 2019, and entitled "Risk control method, computer device, and readable storage medium", which is incorporated herein by reference in its entirety.

TECHNICAL FIELD

The present application relates to the field of computer technologies, and in particular to a risk control method, a computer device, and a readable storage medium.

BACKGROUND

With the development of Internet technologies, videos are disseminated in a variety of ways, such as live webcasts or short videos. Taking a live webcast as an example, the live webcast learns and continues advantages of the Internet. By conducting an online live broadcast in a form of video communication, product demonstrations, related conferences, online training and other content can be published over the Internet on site, and intuitive, interactive, and location unrestricted features and other features of the Internet can be utilized to enhance a promotion effect of the activity site.

"Internet dark industry", simply referred to as dark industry, refers to an industry system in which interest groups formed based on network technologies with clear division of labor and close linkage seek illegal benefits by invading computer information systems, illegally stealing computer information system data including personal information, etc. In order to expand the profitability, the dark industry will always cast a net as widely as possible. Therefore, the dark industry behavior is increasingly evolving to batch and automation, which poses new challenges to risk control. For example, ordinary business platforms often carry out discounts or cash rebates or other activities for marketing purposes. Dark industry performs large-scale arbitrage as soon as they get the message, which is called "getting the best deal" in the industry. The most common method is to register a large number of new users to receive activity awards from a platform.

A risk control system generally relies on IP black and grey lists to filter out known/suspected proxy IPs, and further, depicts a user's portrait, identifies anomalous requests according to the user's most frequently used IPs, and adopts higher-power authentication to distinguish dark industry behavior.

A risk control system of an Internet company is designed as a search system. The inventor has found that when the number of users reaches hundreds of millions, and there is also a huge amount of behavior data, such a risk control system with search as the core will only calculate risk scores upon request, and risk scores required in determining a degree of risk have to be calculated before the risk control system responds. Therefore, the existing risk control system cannot respond quickly.

SUMMARY

In view of the problem, a risk control method, a computer device, and a readable storage medium are now provided, in which two processes, that is, calculating scores and determining a degree of risk, are performed independently, to ensure a high-speed response of a risk control service.

The present application provides a risk control method, which includes a step of calculating risk scores and a step of determining a degree of risk, wherein the step of calculating risk scores includes performing calculation processing on buried point data of a user according to predetermined risk scoring rules, to obtain risk scores; and the step of determining a degree of risk includes receiving a service request of the user and selecting a corresponding risk assessment rule and a corresponding predetermined threshold according to the service request, searching for a risk score corresponding to the risk assessment rule from the scores obtained in the step of calculating risk scores as an assessment score, and comparing the assessment score with the threshold corresponding to the service request, to obtain a risk assessment result.

The present application further provides a computer device including a memory, a processor, and computer-readable instructions stored on the memory and executable by the processor, wherein the processor, when executing the computer-readable instructions, implements a step of calculating risk scores and a step of determining a degree of risk, wherein the step of calculating risk scores includes performing calculation processing on buried point data of a user according to predetermined risk scoring rules, to obtain risk scores; and the step of determining a degree of risk includes receiving a service request of the user and selecting a corresponding risk assessment rule and a corresponding predetermined threshold according to the service request, searching for a risk score corresponding to the risk assessment rule from the scores obtained in the step of calculating risk scores as an assessment score, and comparing the assessment score with the threshold corresponding to the service request, to obtain a risk assessment result.

The present application further provides a computer-readable storage medium having computer-readable instructions stored thereon, wherein the computer-readable instructions, when executed by a processor, cause the processor to implement a step of calculating risk scores and a step of determining a degree of risk, wherein the step of calculating risk scores includes performing calculation processing on buried point data of a user according to predetermined risk scoring rules, to obtain risk scores; and the step of determining a degree of risk includes receiving a service request of the user and selecting a corresponding risk assessment rule and a corresponding predetermined threshold according to the service request, searching for a risk score corresponding to the risk assessment rule from the scores obtained in the step of calculating risk scores as an assessment score, and comparing the assessment score with the threshold corresponding to the service request, to obtain a risk assessment result.

The present application further provides a risk control system, including a risk calculation means and a risk determination means, wherein the risk calculation means is configured to perform calculation processing on buried point data of a user according to predetermined risk scoring rules, to obtain risk scores; and the risk determination means is configured to receive a service request of the user and select a corresponding risk assessment rule and a corresponding predetermined threshold according to the service request, search for a risk score corresponding to the risk assessment rule from the risk scores obtained in the step of calculating risk scores as an assessment score, and compare the assessment score with the threshold corresponding to the service request, to obtain a risk assessment result.

The beneficial effects of the above technical solutions are as follows.

1. In the present application, the two processes, that is, calculating risk scores and determining a degree of risk, are performed independently, to ensure a high-speed response of a risk control service.

2. A risk assessment rule and a predetermined threshold corresponding to a service request can be selected according to the service request, to implement additions, deletions, and combinations of rules without delay and achieve a desirable risk control effect.

3. The data of risk scores is transmitted by using a message queue processing tool to prevent data loss.

4. An expiration time is set for the data of the risk scores in a second database, and meaningless data can be deleted, thereby increasing storage space.

5. The data of the risk scores is buffered in the second database to prevent the system to be suspended.

DETAILED DESCRIPTION OF EMBODIMENTS

Advantages of the present application will be further described below in conjunction with the accompanying drawings and details of the embodiments.

Exemplary embodiments will be described in detail herein, and examples thereof are shown in the accompanying drawings. When the following descriptions involve the accompanying drawings, the same numerals in different drawings refer to the same or similar elements unless otherwise indicated. The implementations described in the following exemplary embodiments do not represent all implementations consistent with the present application. Rather, they are merely examples of apparatuses and methods consistent with some aspects of the present application as detailed in the appended claims.

The terms used in the present application are only for the purpose of describing particular embodiments, and are not intended to limit the present application. The terms "a/an", "said" and "the" in the singular form used in the present application and the appended claims are also intended to include plural forms unless otherwise clearly indicated in the context. It should also be understood that the term "and/or" as used herein refers to and includes any or all possible combinations of one or more associated listed items.

It should be understood that although the terms first, second, third, etc. may be used in the present application to describe various information, the information should not be limited to these terms. These terms are only used to distinguish the same type of information from each other. For example, the first information may also be referred to as second information, and similarly, the second information may also be referred to as first information without departing from the scope of the present application. Depending on the context, the word "if" as used herein may be interpreted as "when" or "upon" or "in response to determining".

In the description of the present application, it should be understood that the reference numbers before the steps do not identify the sequence of execution of the steps, and are only used to facilitate the description of the present application and distinguish each step, and therefore cannot be understood as a limitation on the present application.

Figure 1:
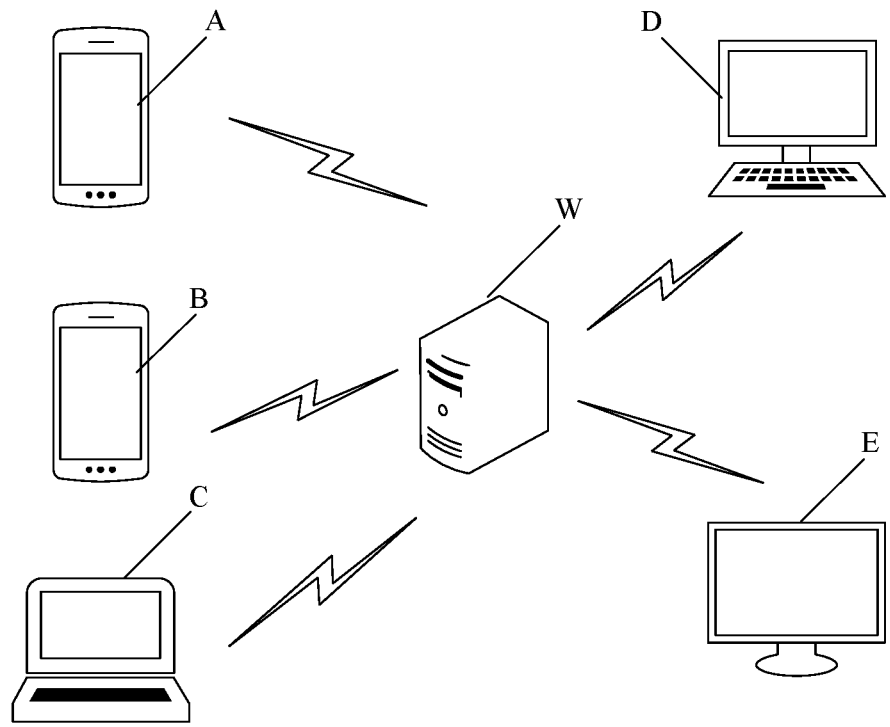
FIG. 1 is a diagram of a system framework corresponding to a risk control method according to the present application.

Referring to FIG. 1, in an embodiment of the present application, in a live broadcast process, a user participates in a live broadcast activity and a prize drawing activity using terminal devices A, B, C, D, and E. The terminal devices A, B, C, D, and E transfer behavior data of the user to a server W, and the server W receives and processes buried point data of the user and calculates risk scores. The user sends a prize drawing service request using the terminal devices A, B, C, D, and E, and risk assessment is performed by the server W in combination with the risk scores to execute a corresponding risk control strategy. Here, only one server W is shown, while in actual applications, the application scenario here may also include a plurality of servers communicating with each other. The server W may be a cloud server or a local server.

Figure 2:
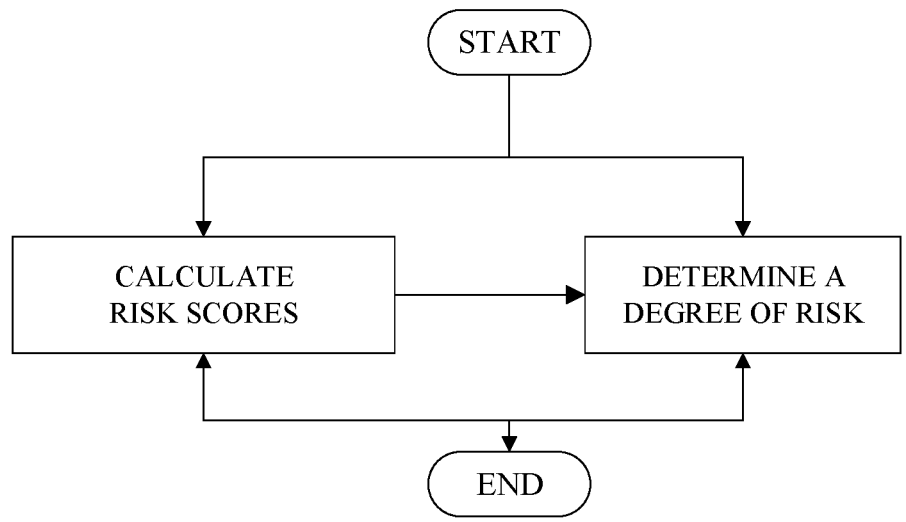
FIG. 2 is a schematic diagram of performing two processes independently in a risk control method according to the present application.

Referring to FIG. 2, a risk control method includes a step of calculating risk scores and a step of determining a degree of risk, wherein the step of calculating risk scores includes performing calculation processing on buried point data of a user according to predetermined risk scoring rules, to obtain risk scores; and the step of determining a degree of risk includes receiving a service request from the user and selecting a corresponding risk assessment rule and a corresponding predetermined threshold according to the service request, searching for a risk score corresponding to the risk assessment rule from the scores obtained in the step of calculating risk scores as an assessment score, and comparing the assessment score with the threshold corresponding to the service request, to obtain a risk assessment result.

In the present application, the two processes, that is, calculating risk scores and determining a degree of risk, are performed independently, to ensure a high-speed response of a risk control service. When calculating risk scores, the server W calculates risk scores respectively from buried point data of the terminal devices A, B, C, D, and E according to predetermined risk scoring rules, to obtain complete data of the risk scores; and when determining the degree of risk, the server W selects a risk assessment rule and a predetermined threshold corresponding to a service request of the terminal device A according to the service request, searches for a risk score corresponding to the risk assessment rule from the risk scores obtained in the step of calculating risk scores, and performs assessment and analysis based on the risk score and the threshold corresponding to the service request, to achieve a desirable risk control effect.

Figure 3:
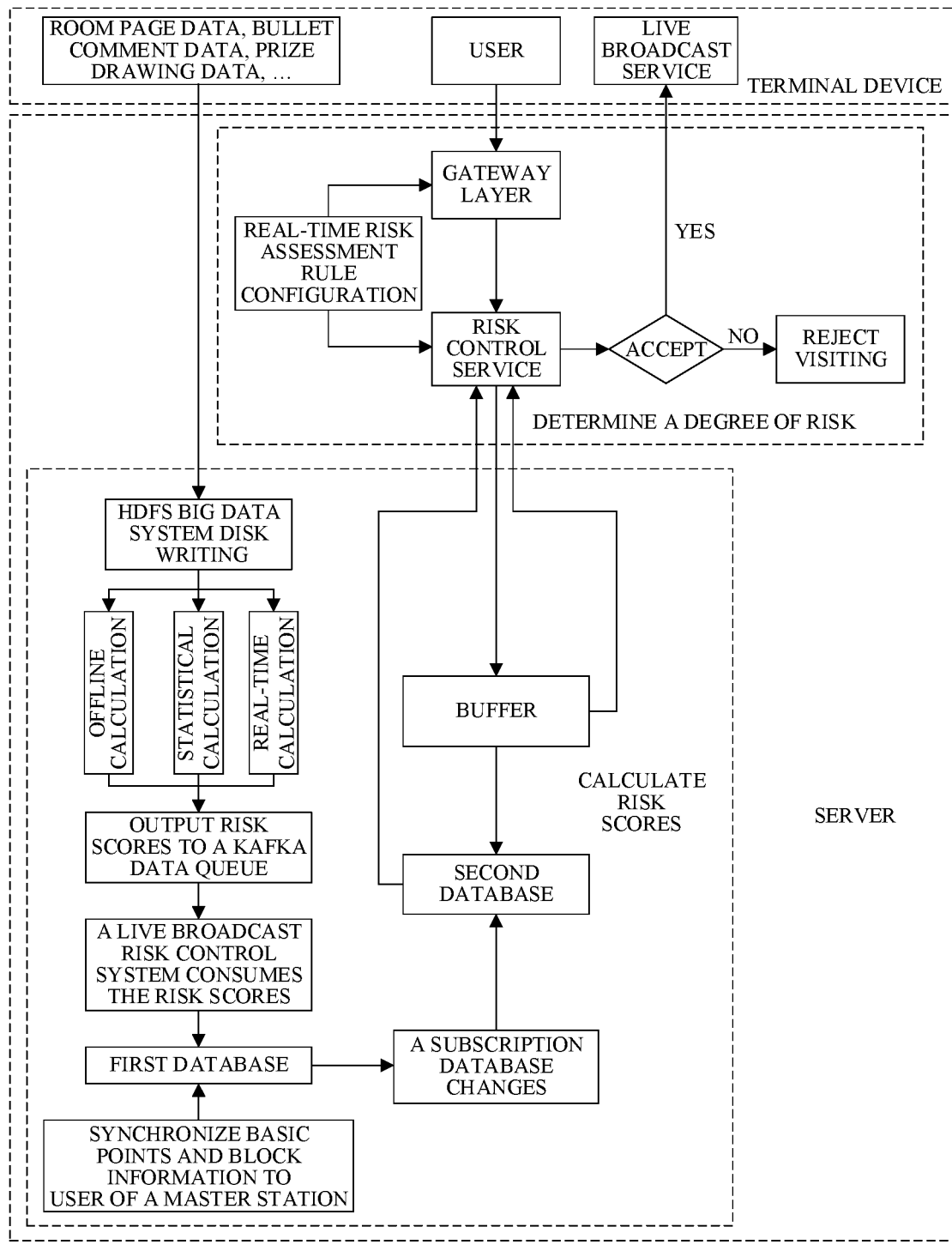
FIG. 3 is a specific schematic diagram of FIG. 2.

Referring to FIG. 3, the server W calculates the risk scores from the buried point data of the terminal devices A, B, C, D, and E, and determines the degree of risk, which is specifically as follows.

Buried point data such as room page data, bullet comment data, or prize drawing data: buried point data of user behavior at the server includes bullet comment connection behavior, bullet comment posting behavior, room page visiting behavior, following behavior, gashapon activity behavior, treasure box receiving behavior, privilege purchase behavior, prize drawing behavior, sign-in behavior, gift-giving behavior, and top-up behavior.

Buried point data transmission: company-level real-time data transmission middleware implements large-scale collection of data.

HDFS big data system disk writing: the buried point data is written into a big data file system HDFS, and a persistent storage provides a calculation basis.

Offline calculation: the data written in the disk is used as input, a MapReduce computing framework is used to perform calculations such as cluster analysis on user behavior, and data obtained is output in a form of user-rule-value.

Statistical calculation: the data written in the disk is used as input, and relatively simple statistical analysis and calculation are performed on user behavior.

Real-time calculation: a real-time stream of data is used as input, and calculation is performed on risk characteristics that the user can expose in a short time.

Output of risk scores to a Kafka data queue: output in a form of user-rule-value is produced to the Kafka data queue.

A live broadcast risk control system consuming the risk scores: a live broadcast risk control data service is responsible for consuming the risk scores of the Kafka data queue.

First database: the first database stores risk scores and synchronizes ban messages of a master station.

Subscription database changes: production enters a data queue.

Second database: after being consumed by the risk control service, the risk scores are persistently stored in the second database (redis database), and all entries have a certain expiration time according to a strategy.

Risk control service: it is responsible for processing a request and returning a determination result of the risk control.

Buffering: An LRU algorithm is used for buffering to alleviate the problem of an excessively high QPS of a service request in the redis database during a peak period, to decrease the QPS by 96%.

Real-time risk assessment rule configuration: according to the determination result of the risk control system, user feedback, and other information of a plurality of aspects, a reasonable rule threshold and rule combinations are formulated with linear regression method, etc.

Figure 4:
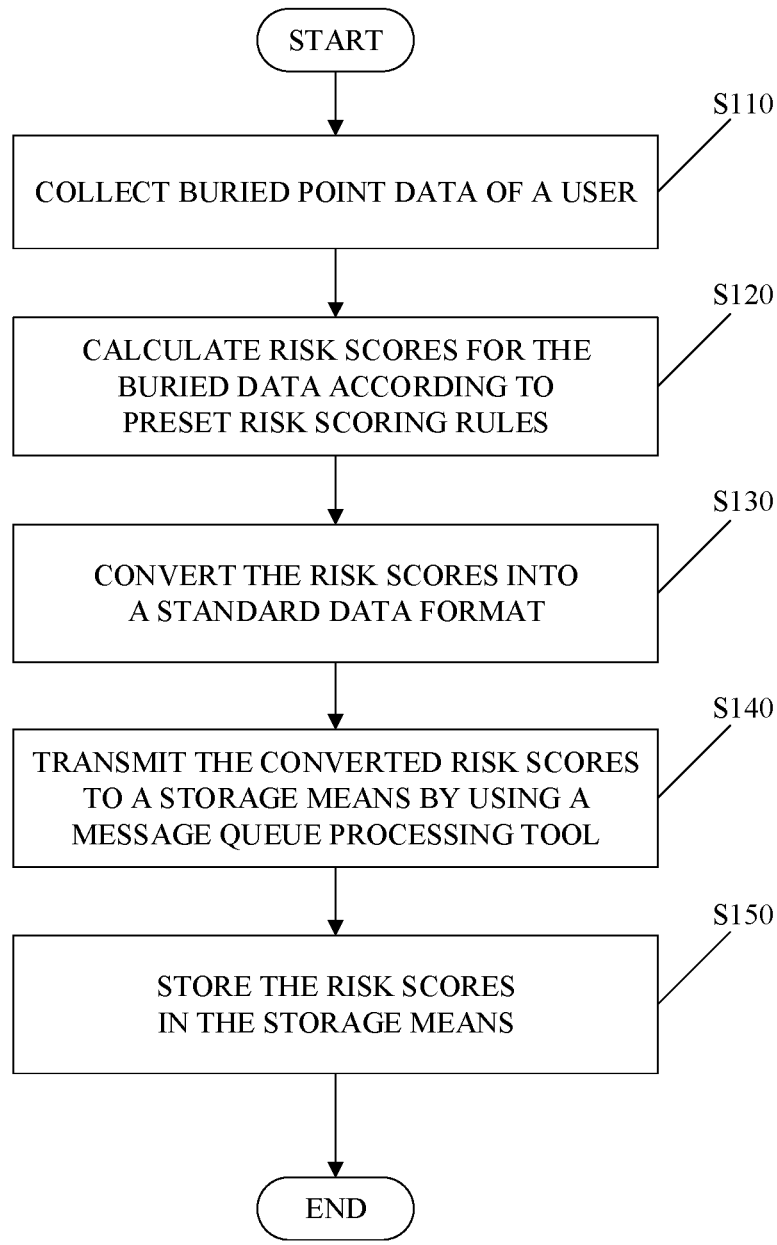
FIG. 4 is a flow chart of a first embodiment for calculating risk scores according to the present application.

Referring to FIG. 4, FIG. 4 is a first embodiment of a process of calculating risk scores. The specific steps thereof include:

S110: collecting the buried point data of the user;

S120: calculating risk scores for the buried point data according to the predetermined risk scoring rules;

S130: converting the risk scores into a standard data format;

S140: transmitting the converted risk scores to a storage means by using a message queue processing tool; and S150: storing the risk scores in the storage means.

In this embodiment, the buried point data in S110 is obtained by the server by collecting at least one of bullet comment connection behavior data, bullet comment posting behavior data, room page visiting behavior data, following behavior data, gashapon activity behavior data, treasure box receiving behavior data, privilege purchase behavior data, exchanging behavior data, prize drawing behavior data, sign-in behavior data, gift-giving behavior data, and top-up behavior data of terminal devices A, B, C, D, and E.

The gashapon activity including a fantasy gashapon machine may appear only during the activity, and one can get one fantasy gashapon coin when a cumulative usage value of gifts of gold melon seeds reaches a predetermined value (which depends on the activity rule). With the fantasy gashapon coin, he or she can participate in a prize draw of the fantasy gashapon machine. About the fantasy gashapon coin: by giving, as a gift, celebration fireworks, goldfish pants, and a small television, as every 10 credit points are produced, he or she can get one fantasy gashapon coin. After the activity, unused fantasy gashapon coins can be exchanged for common gashapon coins at a ratio of 10 to 1. If there are less than 10 fantasy gashapon coins, they cannot be exchanged.

The above examples are for illustration only, and in actual operation, there is no limitation on the exchanging behavior data.

Between S110 and S120, the following is further included: the server W writing the collected buried point data to the big data file system HDFS, the persistent storage providing a calculation basis, and the data written into the disk being used as the basis for the calculation in S120.

In this embodiment, a calculation type of S120 includes offline calculation and/or real-time calculation, and corresponding calculation type is selected according to different application scenarios. A plurality of types of calculations may exist at the same time, or one of the calculation methods can be selected as required, and the buried point data used for calculation in real-time online calculations is behavior data usually generated by a user in a relatively short period of time (for example, 30 seconds, the length of the period of time may be self-defined), while the buried point data used for calculation in offline calculations is usually behavior data generated by a user in a relatively long period of time (for example, 24 hours, the length of the period of time may be self-defined).

Benefits of offline calculation includes the following.
a. the amount of data is abundant, and the determination of user behavior may be more accurate;
b. calculation is isolated from decision-making without real-time pressure; and
c. historical data may be calculated as required, for example, the behavior statistical law of the user in the past one day, the past one week, and the past three months may be calculated to improve accuracy and avoid misjudgments.

Benefits of real-time calculation includes the following. In some service scenarios, dark industry behavior is temporary. From registering an account, to generating behavior on the website, and then to discarding the account, it takes only twenty minutes to achieve the purpose of the dark industry.

In this case, offline calculation is meaningless, and in real-time calculation, data of a certain dimension is aggregated and counted in a short period of time and corresponding determination is made by opening up a data path, using a streaming system (such as Spark Streaming), and according to specific dark industry characteristics.

In this embodiment, the converting the risk scores into a standard data format in S130 is arranging user account information, risk scoring rule information, and risk score information in a predetermined order.

In this embodiment, the message queue processing tool in S140 is a kafka tool, and data is transmitted by using the kafka tool to prevent data loss.

Figure 5:
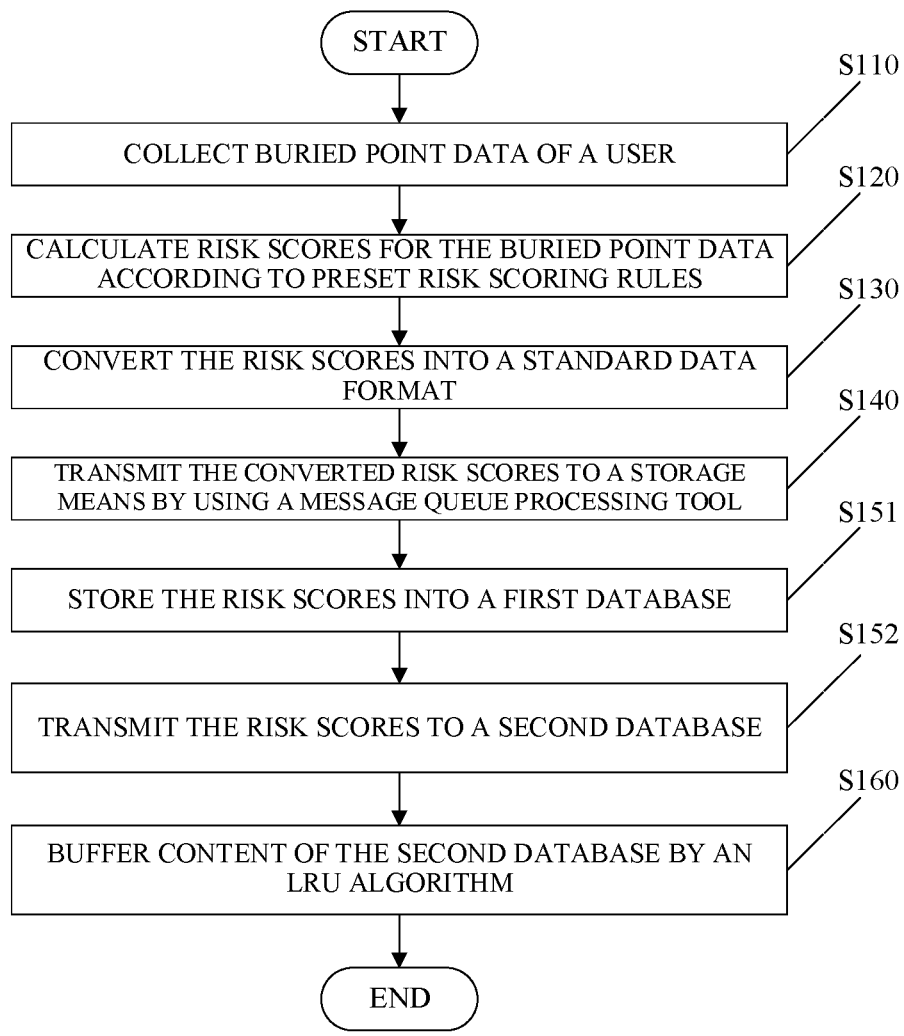
FIG. 5 is a flow chart of a second embodiment for calculating risk scores according to the present application.

Referring to FIG. 5, FIG. 5 is a second embodiment of the process of calculating risk scores. The specific steps thereof include:

S110: collecting the buried point data of the user;
S120: calculating risk scores for the buried point data according to the predetermined risk scoring rules;
S130: converting the risk scores into a standard data format;
S140: transmitting the converted risk scores to a storage means by using a message queue processing tool;
S151: storing the risk scores into a first database; and
S152: transmitting the risk scores to a second database, and setting an expiration time for the risk scores by the second database.

A corresponding time limit is set according to a relationship between generation time of the user behavior and time for a determination result. For example, the user behavior of an activity process needs to be determined. Assuming that the activity process lasts for four hours, buried point data earlier than the start of the activity is expired data and does not need to be transmitted to the second database, and the data is no longer used to calculate the risk scores. The second database (such as the redis database) sets an expiration time for data of the risk scores, and meaningless data may be deleted, thereby increasing storage space.

After the first database transmits the risk scores to the second database, the method further includes:

S160: buffering content of the second database by an LRU algorithm. The system is prevented from being suspended by means of buffering, where the full name of LRU is Least Recently Used, and the Chinese interpretation of LRU is the least recently used.

In this embodiment, the calculation type of S120 includes offline calculation and/or real-time calculation, and corresponding calculation type is selected according to different application scenarios.

In the practice of dark industry, it is found that once a large number of requests are generated, the risk control service will be suspended (time out). Under this stalemate, a query per second of the second database can reach 600K during a peak period, and a caching strategy is thus adopted. The request content in the second database exceeding the query per second is written into a local storage unit, the query per second in the second database is greatly decreased to 2K, and it can alleviate the problem that the query per second in the second database during the peak period is too high.

Figure 6:
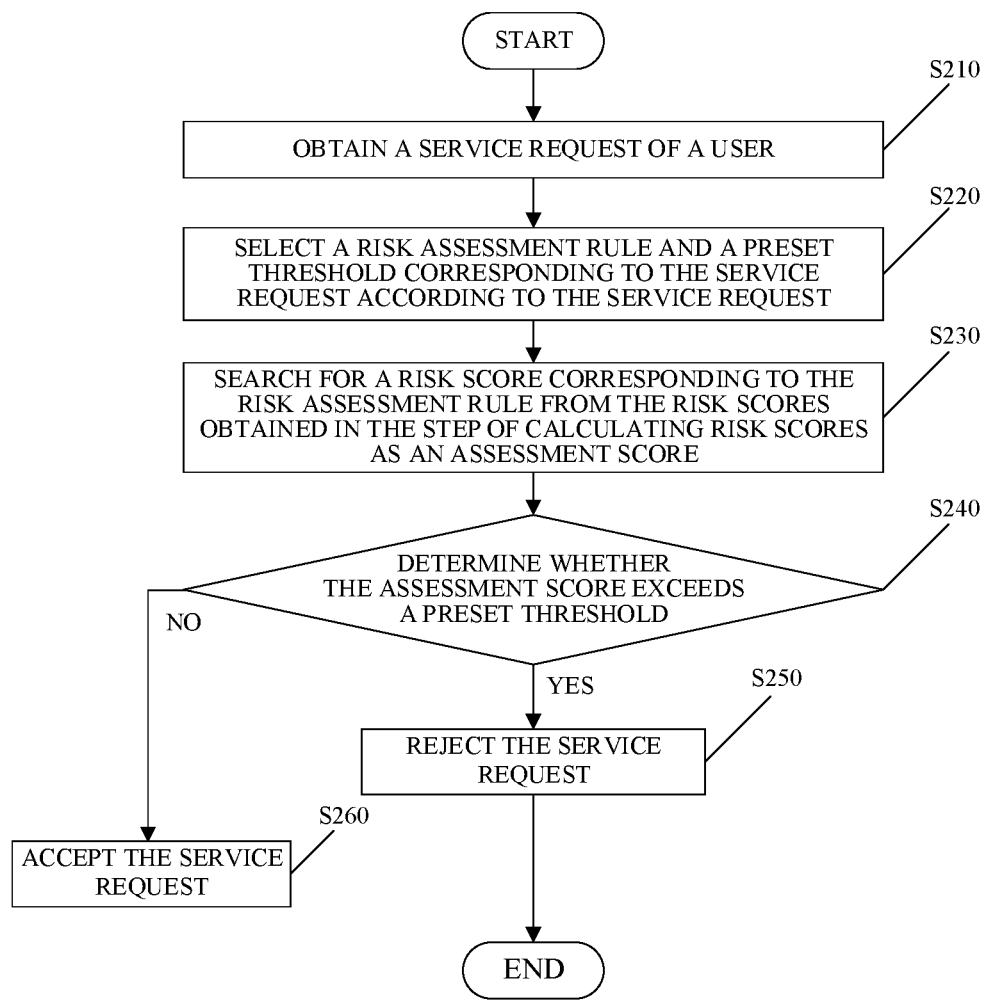
FIG. 6 is a flow chart of determining a degree of risk according to the present application.

Referring to FIG. 6, the step of determining a degree of risk includes:

S210: obtaining a service request of the user;
S220: selecting a risk assessment rule and a predetermined threshold corresponding to the service request according to the service request;
S230: searching for a risk score corresponding to the risk assessment rule from the risk scores obtained in the step of calculating risk scores as an assessment score;
S240: determining whether the assessment score exceeds the predetermined threshold, and if the assessment score exceeds the predetermined threshold, performing S250, or if the assessment score does not exceed the predetermined threshold, performing S260;
S250: rejecting the service request; and
S260: accepting the service request.

Whether it is offline calculation or real-time calculation, it is determined that the user account will be banned only after risk assessment rules are configured and the risk score under the risk assessment reaches the threshold. Therefore, the combination and matching of risk assessment rules and the value of the threshold determine the accuracy of the interception of the risk control system and the recall rate. The real-time configuration of risk assessment rules becomes the key to flexible risk control. In this embodiment, risk assessment rules in S220 are combined and matched according to service requests, and different service requests have different combinations.

In this embodiment, rejecting the service request in S250 may be rejecting browsing a web page, rejecting entering the live broadcast room, rejecting participating in the prize drawing, or the like, and accepting the service request in S260 may be allowing browsing a web, allowing entering the live broadcast room, allowing participating in the prize drawing, or the like. In addition, when the risk assessment is performed, the assessment result can also be stored for later reference or processing.

The risk assessment rules may be different logical combinations, and a first embodiment of a risk assessment rule and a second embodiment of a risk assessment rule will be used as examples for illustration respectively.

First Embodiment of a Risk Assessment Rule: the Risk Assessment Rule is a Logical AND Rule The predetermined risk scoring rules in S120 may be set according to the requirements of risk monitoring. It is assumed that there are 50 predetermined risk scoring rules for the buried point data, including a first risk scoring rule, a second risk scoring rule, a third risk scoring rule, . . . , and a fiftieth risk scoring rule, respectively. When risk scores are calculated for a first user account, the following can be obtained respectively: a first risk score of the first user account corresponding to the first risk scoring rule, a second risk score of the first user account corresponding to the second risk scoring rule, . . . , and a fiftieth risk score of the first user account corresponding to the fiftieth risk scoring rule.

If the buried point data is collected, the risk scores are calculated according to the predetermined risk scoring rules, and in a current scoring period, if the buried point data is determined to be anomaly behavior in the case of the predetermined risk scoring rules, a risk score of the user account in the case of the predetermined risk scoring rules is a non-zero value. For example, for one anomaly, a risk score of the user account in the case of the predetermined risk scoring rules is 1 point. The larger the number of times anomaly behavior occurs, the higher a cumulative risk score of the user account is in the case of the predetermined risk scoring rules. For example, if there are five anomalies, the cumulative risk score of the user account in the case of the predetermined risk scoring rules is 5 points. If the buried point data is determined to be normal behavior in the case of the predetermined risk scoring rules, the risk score of the user account in the case of the predetermined risk scoring rules is 0 point. If no buried point data is collected, the risk score of the user account in the case of the predetermined risk scoring rules is 0.

In the current scoring period, the risk control system receives a prize drawing service request of a first user ID1, configures the risk assessment rule for the prize drawing service request as a logical combination of a first risk scoring rule, a second risk scoring rule, and a fifth risk scoring rule, and reads ID1-first risk scoring rule-3 points, reads ID1-second risk scoring rule-10 points, and reads ID1-fifth risk scoring rule-100 points. Then, the total risk score is calculated as 3+10+100=113, and a set threshold corresponding to the prize drawing service request is 100. The threshold is exceeded, thus the prize drawing service request of the user ID1 is rejected.

Second Embodiment of a Risk Assessment Rule: the Risk Assessment Rule is a Logical OR Rule In the current scoring period, the risk control system receives a prize drawing service request from a first user ID1, configures the risk assessment rule for the prize drawing service request as a logical combination of a first risk scoring rule, a second risk scoring rule, and a fifth risk scoring rule, and reads ID1-first risk scoring rule-3 points, reads ID1-second risk scoring rule-10 points, and reads ID1-fifth risk scoring rule-100 points. A first threshold is 20, a second threshold is 30, and a fifth threshold is 50. Then ID1-first risk scoring rule-3 points<20 (the first threshold), ID1-second risk scoring rule-10<30 (the second threshold), ID1-fifth risk scoring rule-100 points>50 points (the fifth threshold). The threshold is exceeded, thus the prize drawing service request of the user ID1 is rejected.

Figure 7:
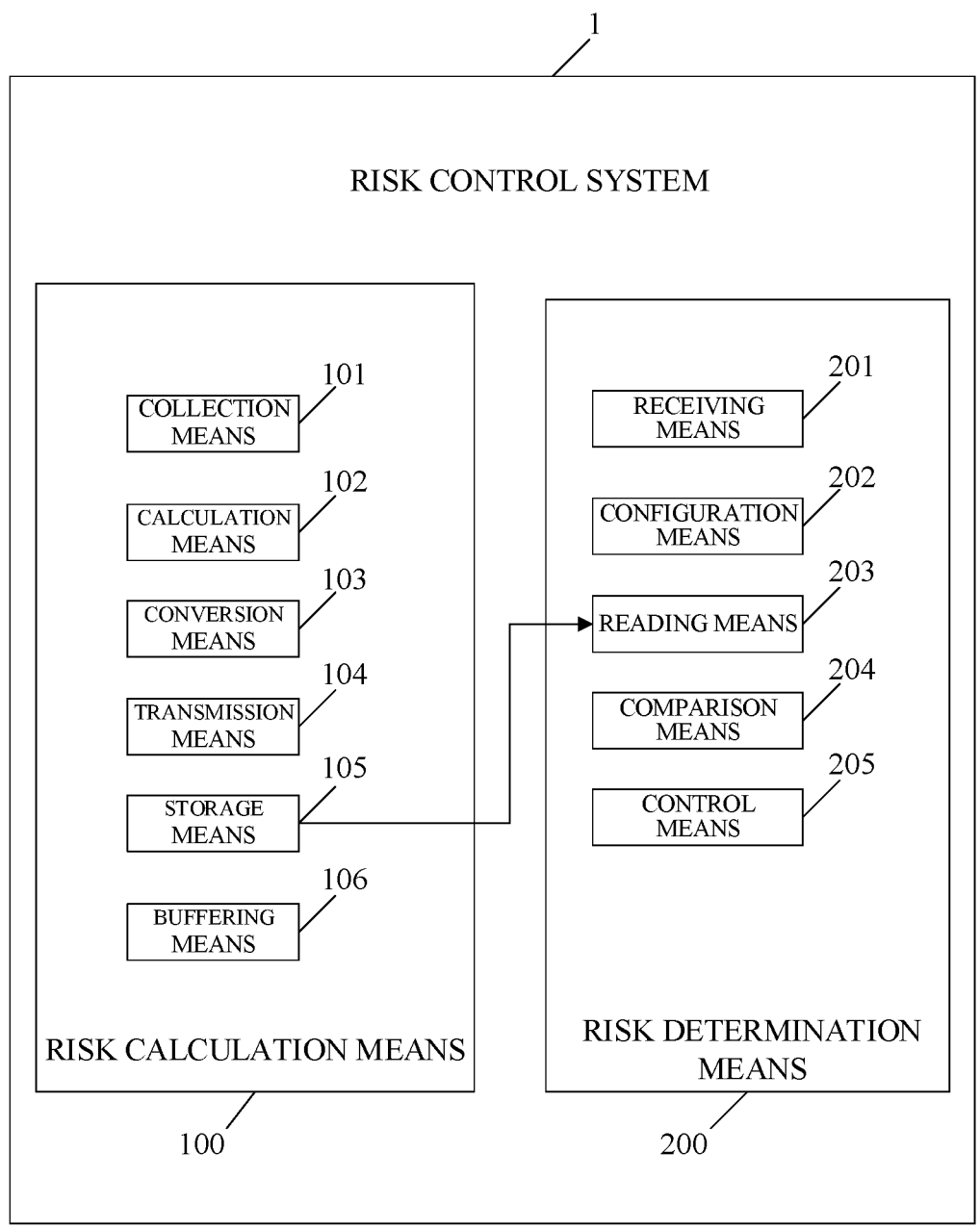
FIG. 7 is a diagram of means of a risk control system according to the present application.

Referring to FIG. 7, the present application provides a risk control system 1, which includes:

a risk calculation means 100 configured to perform calculation processing on buried point data of a user according to predetermined risk scoring rules, to obtain risk scores; and a risk determination means 200 configured to receive a service request from the user and select a corresponding risk assessment rule and a corresponding predetermined threshold according to the service request, search for a risk score corresponding to the risk assessment rule from the risk scores obtained in the step of calculating risk scores as an assessment score, and compare the assessment score with the threshold corresponding to the service request, to obtain a risk assessment result.

The risk calculation means 100 and the risk determination means 200 operate independently.

In this embodiment, the risk calculation means 100 includes:

a collection means 101 configured to collect the buried point data of the user;

a calculation means 102 configured to calculate risk scores for the buried point data according to the predetermined risk scoring rules;

a conversion means 103 configured to convert the risk scores into a standard data format;

a transmission means 104 configured to transmit the converted risk scores to a storage means by using a message queue processing tool; and a storage means 105 configured to store the risk scores.

In this embodiment, the buried point data includes at least one of: bullet comment connection behavior data, bullet comment posting behavior data, room page visiting behavior data, following behavior data, gashapon activity behavior data, treasure box receiving behavior data, privilege purchase behavior data, exchanging behavior data, prize drawing behavior data, sign-in behavior data, gift-giving behavior data, and top-up behavior data.

In this embodiment, the conversion means 103 converting the risk scores into a standard data format is arranging user account information, risk scoring rule information, and risk score information in a predetermined order.

In this embodiment, the storage means 105 first stores the risk scores into a first database; and then transmits the risk scores to a second database, with an expiration time for the risk scores set by the second database.

In this embodiment, the risk control system includes a buffer means 106 configured to buffer content of the second database by means of an LRU algorithm.

In this embodiment, types of calculation performed by the calculation module include offline calculation and/or real-time calculation, and the corresponding calculation types are selected according to different application scenarios.

The risk determination means 200 includes:

a receiving means 201 configured to obtain a service request of the user;

a configuration means 202 configured to select a risk assessment rule and a predetermined threshold corresponding to the service request according to the service request;

a reading means 203 configured to search for a risk score corresponding to the risk assessment rule in the storage means 105 as the assessment score;

a comparison means 204 configured to determine whether the assessment score exceeds the predetermined threshold; and a control means 205 configured to reject the service request or accept the service request according to a result of the determination.

Figure 8:
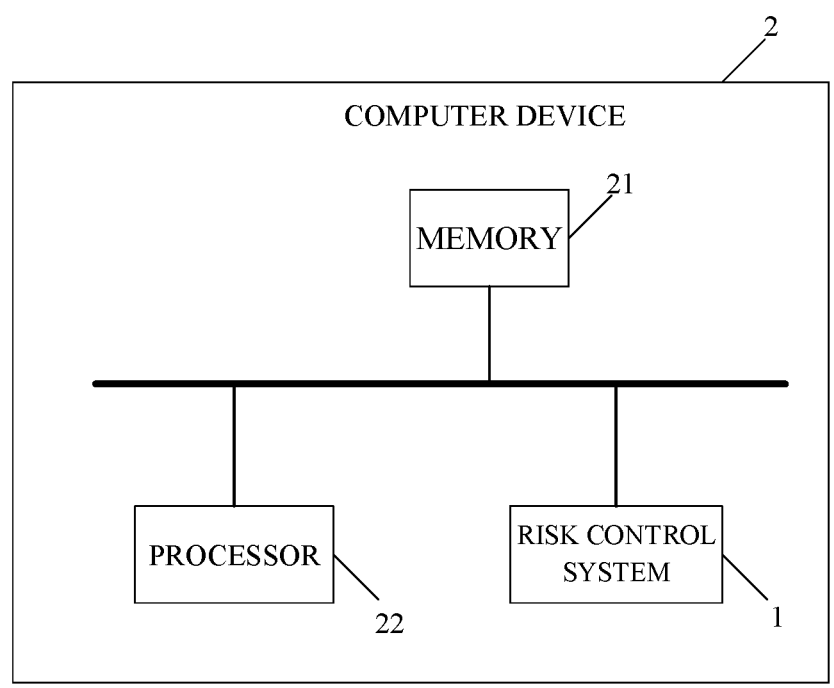
FIG. 8 is a schematic diagram of a hardware structure of a computer device of a risk control method according to the present application.

Referring to FIG. 8, the present application further provides a computer device 2, and the computer device 2 includes:

a memory 21 configured to store executable program codes; and a processor 22 configured to call the executable program codes in the memory 21, and the execution steps include the above risk control method.

In FIG. 8, one processor 22 is taken as an example.

As a non-volatile computer-readable storage medium, the memory 21 may be configured to store non-volatile software programs, non-volatile computer-executable programs and modules, such as program instructions/means corresponding to the risk control method in the embodiments of the present application. The processor 22 executes various functional applications and data processing of the computer device 2, that is, implements the risk control method in the foregoing method embodiments, by running non-volatile software programs, instructions, and means stored in the memory 21.

The memory 21 may include a program storage area and a data storage area, where the program storage area may store an operating system and an application program required by at least one function; and the data storage area may store buried point data of a user in the computer device 2. In addition, the memory 21 may include a high-speed random access memory, and may also include a non-volatile memory, such as at least one magnetic disk storage device, a flash memory device, or other non-volatile solid-state storage devices. In some embodiments, the memory 21 may optionally include memories 21 disposed remotely relative to the processor 22, and these remote memories 21 may be connected to the risk control system 1 through a network. Instances of the above network include, but are not limited to, the Internet, an enterprise intranet, a local area network, a mobile communication network, and a combination thereof.

The one or more means are stored in the memory 21, and when executed by the one or more processors 22, execute the risk control method in any of the foregoing method embodiments, for example, the above program described in FIGS. 4 to 6.

The above products can execute the methods provided in the embodiments of the present application, and have functional means and beneficial effects corresponding to the execution of the methods. For technical details not described in detail in this embodiment, reference can be made to the methods provided in the embodiments of the present application.

The computer device 2 in the embodiment of the present application exists in various forms, including but not limited to:

(1) Mobile communication device: such a device is characterized by mobile communication functions, and its main goal is to provide voice and data communications. Such a terminal includes: a smart phone (such as iPhone), a multimedia phone, a functional phone, and a low-end phone.

(2) Ultra-mobile personal computer device: such a device belongs to the category of personal computers, has calculation and processing functions, and generally also has mobile Internet access features. Such a terminal includes: a PDA device, a MID device, and a UMPC device, such as iPad.

(3) Portable entertainment device: such a device can display and play multimedia content. Such a device includes: an audio player, a video player (such as iPod), a handheld game console, an e-book, as well as an intelligent toy and a portable vehicle navigation device.

(4) Server: a device that provides computing services. The server includes a processor, a hard disk, a memory, a system bus, etc. The server is similar to a general computer architecture, but because it needs to provide highly reliable services, there are high requirements on the server in terms of processing capacity, stability, reliability, security, scalability, and manageability.

(5) Other electronic apparatuses with data exchange functions.

Another embodiment of the present application further provides a non-volatile computer-readable storage medium, the computer-readable storage medium stores computer-executable instructions, and the computer-executable instructions when executed by one or more processors, such as one processor 22 in FIG. 8, can enable the above one or more processors 22 to execute the risk control method in any of the above method embodiments, for example, to execute the programs in FIGS. 4 to 6 described above.

The apparatus embodiments described above are merely illustrative. The units described as separate components may or may not be physically separated, and the components displayed as units may or may not be physical units, that is, they may be located in one place, or may be distributed on at least two network units. Some or all of the means may be selected according to actual needs to achieve the objectives of the solutions of the embodiments of the present application. Those of ordinary skill in the art can understand and implement the solutions without any creative effort.

Through the description of the above implementations, those of ordinary skill in the art can clearly understand that each implementation can be implemented by software plus a general hardware platform, and certainly, it can also be implemented by hardware. Those of ordinary skill in the art can understand that all or some of the processes in the methods of the foregoing embodiments can be implemented by computer-readable instructions to instruct relevant hardware. The program described can be stored in a computer-readable storage medium. When the program is executed, the step of calculating risk scores and the step of determining a degree of risk can be implemented, where the step of calculating risk scores includes performing calculation processing on buried point data of a user according to predetermined risk scoring rules, to obtain the risk scores; and the step of determining a degree of risk includes receiving a service request from the user and selecting a corresponding risk assessment rule and a corresponding predetermined threshold according to the service request, searching for a risk score corresponding to the risk assessment rule from the risk scores obtained in the step of calculating risk scores and using the risk score as an assessment score, and comparing the assessment score with the threshold corresponding to the service request, to obtain a risk assessment result. Here, the storage medium may be a magnetic disk, an optical disc, a Read-Only Memory (ROM), or a Random Access Memory (RAM), and so on.

Finally, it should be noted that the above embodiments are only for illustrating rather than limiting the technical solutions of the present application; although the present application has been described in detail with reference to the foregoing embodiments, those of ordinary skill in the art should understand that: the technical solutions described in the foregoing embodiments can still be modified, or some or all of the technical features therein can be equivalently replaced; and these modifications or replacements do not make the essence of the corresponding technical solutions depart from the scope of the technical solutions of the embodiments of the present application.

The invention claimed is:

1. A method of controlling risk associated with a computer service, comprising:

collecting buried point data of a user, wherein the buried point data of the user indicates activities of the user on computer services;

determining a plurality of risk scores indicative of risk behaviors associated with the user by performing calculation processing on the buried point data of the user based on predetermined risk scoring rules, wherein the buried point data comprises at least one of data indicative of a user's bullet comment connection behavior, data indicative of the user's bullet comment posting behavior, data indicative of the user's room page visiting behavior, data indicative of the user's following behavior;

converting the plurality of risk scores into a standard data format;

transmitting the converted plurality of risk scores to a storage in a first database using a message queue processing tool;

transmitting the converted plurality of risk scores to a second database and setting an expiration time for the converted plurality of risk scores by the second database, wherein the second database is configured to prevent a risk control service from suspending during a peak period due to an inability to respond to a peak number of queries per second;

determining a degree of risk associated with a service request from the user on the computer service, wherein the determining a degree of risk further comprises:
receiving the service request from the user,
determining at least two risk assessment rules based on the service request,
determining at least two assessment scores by searching for risk scores among the converted plurality of risk scores based on the at least two risk assessment rules, and
determining a service risk assessment result based on the at least two assessment scores; and
rejecting the service request after the service risk assessment result reaches at least one predetermined threshold.

2. The method according to claim 1, wherein the determining the plurality of risk scores further comprises:
collecting the buried point data associated with the user;
calculating the plurality of risk scores based on the buried point data according to the predetermined risk scoring rules.

3. The method according to claim 2, wherein the converting the plurality of risk scores into a standard data format comprises arranging user account information, risk scoring rule information, and risk score information in a predetermined order.

4. The method according to claim 2, wherein a calculation type of the calculating the plurality of risk scores based on the buried point data according to the predetermined risk scoring rules comprises an offline calculation or a real-time calculation.

5. The method according to claim 1, wherein the buried point data further comprises at least one of: data indicative of the user's gashapon activity behavior, data indicative of the user's treasure box receiving behavior, data indicative of the user's exchanging behavior, data indicative of the user's prize drawing behavior, data indicative of the user's gift-giving behavior, or data indicative of the user's top-up behavior.

6. The method according to claim 1, wherein the method further comprises:
buffering content in the second database by a Least Recently Used (LRU) algorithm after transmitting the converted plurality of risk scores to the second database.

7. The method according to claim 1, wherein the determining a service risk assessment result based on the at least two assessment scores comprises:
determining whether one or more of the at least two the assessment scores exceed one or more corresponding predetermined thresholds;
in response to determining that one or more of the at least two the assessment scores exceed the one or more corresponding predetermined threshold, rejecting the service request.

8. A computer device comprising a memory, a processor, and computer-readable instructions stored on the memory and executable by the processor, wherein the processor, when executing the computer-readable instructions, implements operations to control risk on a computer service comprising:
collecting buried point data of a user, wherein the buried point data of the user indicates activities of the user on computer services;
determining a plurality of risk scores indicative of risk behavior associated with the user by performing calculation processing on buried point data of the user based on predetermined risk scoring rules, wherein the buried point data comprises at least one of data indicative of a user's bullet comment connection behavior, data indicative of the user's bullet comment posting behavior, data indicative of the user's room page visiting behavior, data indicative of the user's following behavior;
converting the plurality of risk scores into a standard data format;
transmitting the converted plurality of risk scores to a storage in a first database using a message queue processing tool;
transmitting the converted plurality of risk scores to a second database and setting an expiration time for the plurality of risk scores by the second database, wherein the second database is configured to prevent a risk control service from suspending during a peak period due to an inability to respond to a peak number of queries per second;
determining a degree of risk associated with a service request from the user on the computer service, wherein the determining a degree of risk further comprises:
receiving the service request from the user,
determining at least two risk assessment rules based on the service request,
determining at least two assessment scores by searching for risk scores among the converted plurality of risk scores based on the at least two risk assessment rules, and
determining a service risk assessment result based on the at least two assessment scores; and
storing the service risk assessment result for use in controlling the activity of the user based on at least one predetermined threshold.

9. The computer device according to claim 8, wherein the determining plurality of risk scores further comprises:
collecting the buried point data associated with the user;
calculating the plurality of risk scores based on the buried point data according to the predetermined risk scoring rules.

10. The computer device according to claim 9,
wherein the converting the plurality of risk scores into a standard data format comprises arranging user account information, risk scoring rule information, and risk score information in a predetermined order;
wherein a calculation type of the calculating the plurality of risk scores based on the buried point data according to the predetermined risk scoring rules comprises an offline calculation or a real-time calculation.

11. The computer device according to claim 9, wherein the storing the converted plurality of risk scores in the storage further comprises:
buffering content in the second database by a Least Recently Used (LRU) algorithm.

12. The computer device according to claim 8, wherein the buried point data comprises at least one of: data indicative of the user's gashapon activity behavior, data indicative of the user's treasure box receiving behavior, data indicative of the user's exchanging behavior, data indicative of the user's prize drawing behavior, data indicative of the user's gift-giving behavior, or data indicative of the user's top-up behavior.

13. The computer device according to claim 8, wherein the determining a service risk assessment result based on the at least two assessment scores comprises:

determining whether one or more of the at least two the assessment scores exceed one or more corresponding predetermined thresholds;

in response to determining that one or more of the at least two the assessment scores exceed the one or more corresponding predetermined threshold, rejecting the service request.

14. A non-transitory computer-readable storage medium having computer-readable instructions stored thereon, wherein the computer-readable instructions, when executed by a processor, cause the processor to implement operations to control risk on a computer service comprising:

collecting buried point data of a user, wherein the buried point data of the user indicates activities of the user on computer services;

determining a plurality of risk scores indicative of risk behaviors associated with the user by performing calculation processing on the buried point data of the user based on predetermined risk scoring rules, wherein the buried point data comprises at least one of data indicative of a user's bullet comment connection behavior, data indicative of the user's bullet comment posting behavior, data indicative of the user's room page visiting behavior, data indicative of the user's following behavior;

converting the plurality of risk scores into a standard data format;

transmitting the converted plurality of risk scores to a storage in a first database using a message queue processing tool;

transmitting the converted plurality of risk scores to a second database and setting an expiration time for the plurality of risk scores by the second database, wherein the second database is configured to prevent a risk control service from suspending during a peak period due to an inability to respond to a peak number of queries per second;

determining a degree of risk associated with a service request from the user on the computer service, wherein the determining a degree of risk further comprises:

receiving the service request from the user, determining at least two risk assessment rules based on the service request, determining at least two assessment scores by searching for risk scores among the converted plurality of risk scores based on the at least two risk assessment rules, and determining a service risk assessment result based on the at least two assessment scores; and storing the service risk assessment result for use in controlling the activity of the user based on at least one predetermined threshold.

15. The non-transitory computer-readable storage medium according to claim 14, wherein the determining plurality of risk scores further comprises:

collecting the buried point data associated with the user;

calculating the plurality of risk scores based on the buried point data according to the predetermined risk scoring rules.

16. The non-transitory computer-readable storage medium according to claim 15, wherein the storing the converted plurality of risk scores in the storage further comprises:

buffering content in the second database by a Least Recently Used (LRU) algorithm.

17. The non-transitory computer-readable storage medium according to claim 14, wherein the buried point data further comprises at least one of: data indicative of the user's gashapon activity behavior, data indicative of the user's treasure box receiving behavior, data indicative of the user's exchanging behavior, data indicative of the user's prize drawing behavior, data indicative of the user's gift-giving behavior, or data indicative of the user's top-up behavior.

18. The non-transitory computer-readable storage medium according to claim 15, wherein the determining a service risk assessment result based on the at least two assessment scores comprises:

determining whether one or more of the at least two the assessment scores exceed one or more corresponding predetermined thresholds;

in response to determining that one or more of the at least two the assessment scores exceed the one or more corresponding predetermined threshold, rejecting the service request.

* * * * *